April 6, 1965 A. STEINER 3,176,729
FILLING MACHINE
Filed Dec. 6, 1962 2 Sheets-Sheet 1
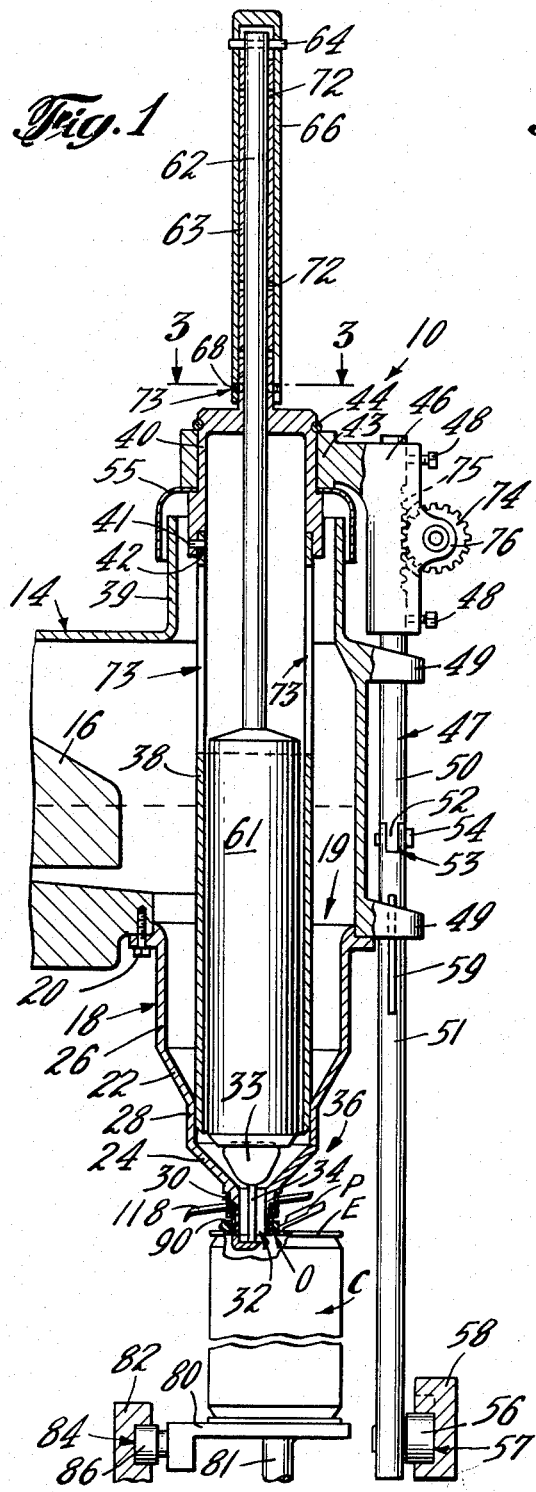
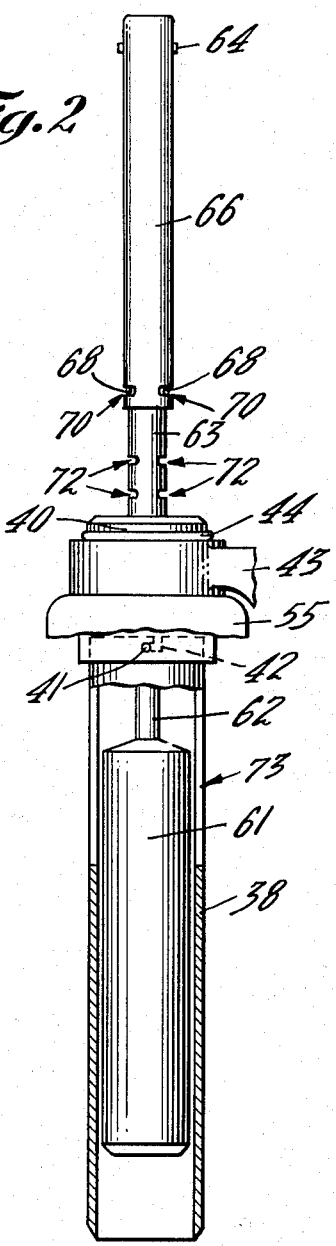
INVENTOR.
ALFRED STEINER
BY George P. Ziehmer
George W. Reiber
ATTORNEYS April 6, 1965        A. STEINER        3,176,729
FILLING MACHINE
Filed Dec. 6, 1962        2 Sheets-Sheet 2
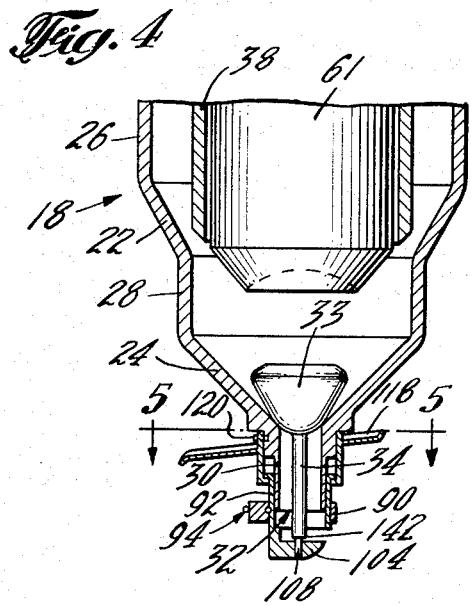
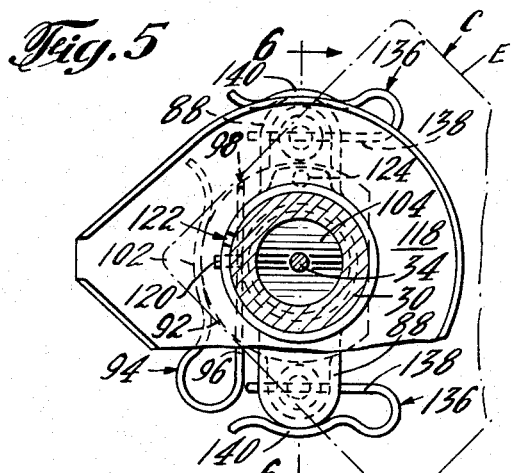
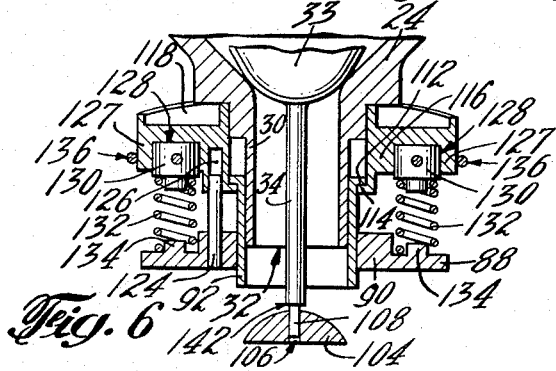
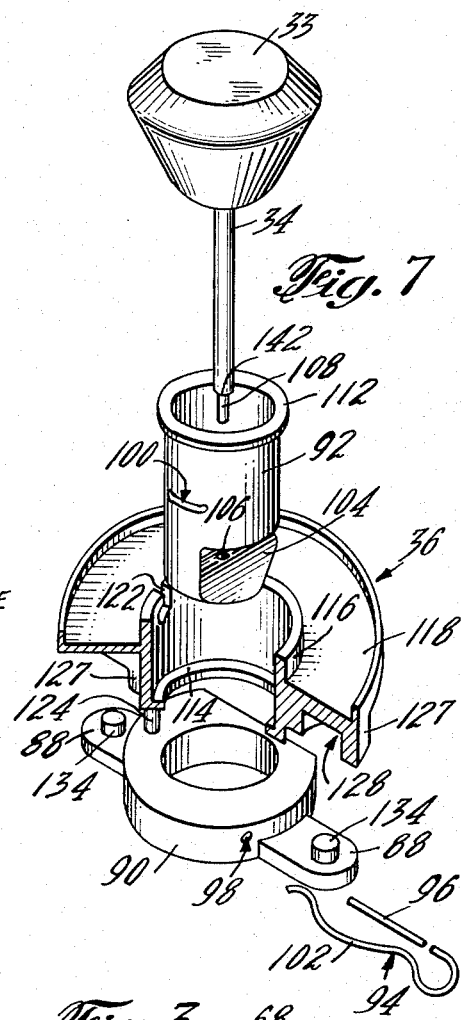
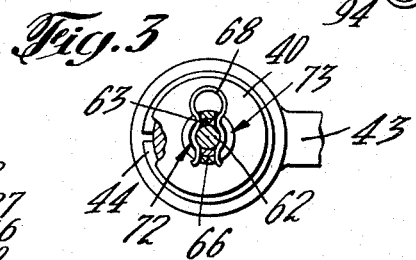
INVENTOR.
ALFRED STEINER
BY George P. Ziehmer
George W. Reiber
ATTORNEYS

United States Patent Office 3,176,729
Patented Apr. 6, 1965

3,176,729
FILLING MACHINE
Alfred Steiner, Irvington, N.J., assignor to American Can Company, New York, N.Y., a corporation of New Jersey
Filed Dec. 6, 1962, Ser. No. 242,831
16 Claims. (Cl. 141—275)

The present invention relates to milk filling machines and has particular reference to an easily adjustable filling head for such machines which is so constructed that its various parts may be readily assembled and disassembled to provide for easy cleaning of the parts.

In order to comply with the sanitary ordinances in many areas, it is necessary that milk fillers be disassembled at the end of each run and their various valve parts be flushed thoroughly with a detergent or disinfection solution in order to remove all traces of the milk and thus prevent the growth of potentially harmful bacteria, and then again disinfected just prior to the next run. This is true whether the run comprises a full day's operation, or only a short run of a particular product. In order to accomplish this in a minimum of time, it is highly desirable that the filler be so constructed that the filling head parts are capable of being disassembled and reassembled simply and quickly.

In many areas, the ordinances also require that whenever new milk-contacting parts of the filler are used, the whole machine must be shut down and thoroughly disinfected. Thus, it is highly desirable that no change parts be required to permit variations in the volume of milk delivered by the machine because of changes in the sizes of the containers being run through it, since such changes are made several times a day in many dairies and the use of change parts imposes a considerable handicap on the dairy in the form of lost production and increased cleaning time.

The present invention satisfies both of these requirements by providing a filling head which is easily adjustable to provide the necessary variations in the volume of fill required by the commonly run container sizes without the use of change parts, and wherein the movable parts of the head are readily and easily assembled and disassembled to permit quick and easy cleaning.

An object of the invention, therefore, is the provision of a milk filler head which is constructed to provide for ready adjustment of the volume of fill without the utilization of change parts.

Another object is the provision of such a head wherein the various operating parts of the shut-off valve mechanism are easily and completely disassembled to meet the strict sanitary requirements of the diary industry.

Still another object is the provision in a milk filler head of a valve which is formed with a simple and positive opening and closing mechanism which is operated by the container being filled and which completely eliminates internal pockets or crevices in which the milk may be entrapped.

Numerous other objects and advantages of the invention will be apparent as it is better understood from the following description, which, taken in connection with the accompanying drawings, discloses a preferred embodiment thereof.

Referring to the drawings:

FIGURE 1 is a sectional view of the filling head portion of a milk filling machine embodying the principles of the instant invention, the view showing the filling head valve mechanism in open position;

FIG. 2 is a side elevation of the adjustable charge measuring portion of the filling head of FIG. 1, but showing the parts set to deliver a greater volume of liquid than is delivered by the setting of the parts in FIG. 1, parts being shown in section and parts being broken away;

FIG. 3 is a horizontal sectional view taken substantially along the line 3—3 in FIG. 1;

FIG. 4 is a vertical section taken through the lower portion of the filling head of FIG. 1, with the measuring portion thereof in raised position and the valve in closed position, parts being broken away;

FIG. 5 is a horizontal section taken substantially along the line 5—5 in FIG. 4, parts being broken away;

FIG. 6 is a vertical section taken substantially along the line 6—6 in FIG. 5; and FIG. 7 is an exploded view of various separable portions of the valve mechanism of FIG. 4.

As a preferred and exemplary embodiment of the invention, the drawings illustrate a filling head 10 which is mounted in a milk filling machine of the type generally disclosed in United States Letters Patent 2,222,617, issued on November 26, 1940 to J. M. Hothersall and William Pechy, on "Filling Machine." In such machine, the milk or similar product is filled into rectangular fibre milk cartons C of the type disclosed in United States Letters Patent 2,085,979, issued July 6, 1937 to J. M. Hothersall, on "Container." These cartons C are provided in a number of different capacities, such as half pint, one third of a quart, one pint, and one quart, each of these sizes varying at least in height, and sometimes in their base dimensions.

Each carton C is formed with a filling and dispensing opening O (see FIGS. 1 and 5) which is located in one corner of its flat upper end E, and with an expandable hinged plug P which is initially folded backwardly to the position shown in FIG. 1, but which is adapted to enter and seal the opening O after the filling operation has been completed. As is usual in dairies, only one size of carton C is run in the filling machine at any one time, but the size being run is sometimes changed several times a day, particularly in the smaller dairies where one machine may be used to fill a complete range of container sizes.

The filling machine is preferably of the rotary type and is provided with a rotatable reservoir 14 which is mounted on a central bearing shaft (not shown) and which contains a large supply of the milk or other dairy product which is to be filled into the individual cartons C, a constant level of the dairy product being maintained in the reservoir by means of a conventional float valve 16. A plurality of filling heads 10 are mounted around the periphery of the reservoir 14 in equally spaced relationship.

As best seen in FIG. 1, each filling head 10 includes a funnel 18 which is removably secured in any suitable manner to the bottom of the reservoir around an opening 19 which is formed therein. As seen in FIG. 1, the funnel may be held in place by a plurality of bolts 20 which thread into the bottom wall of the reservoir 14. A thin replaceable gasket (not shown) is interposed between the funnel 18 and reservoir 14 to prevent leakage.

The funnel 18 is formed with upper and lower tapered wall portions 22, 24, and three cylindrical wall portions 26, 28, 30 of decreasing diametral dimensions, the bottommost wall portion 30 forming a nozzle which terminates in a discharge orifice 32. The nozzle 30 is normally closed by the generally conical head 33 of a valve stem member 34 which forms an element of a valve mechanism, generally designated by the numeral 36, which is secured to the bottom end of the funnel 18.

Each filling head 10 is also provided with a cylindrical, vertically reciprocable measuring sleeve 38 which provides the means for segregating a measured charge of liquid from the liquid in the reservoir 14 prior to the time the valve 36 is opened. The bottom edge of the sleeve 38 is tapered and is insertable into the intermediate cylindrical funnel wall portion 28, as seen in FIG. 1.

The upper end of the measuring sleeve 38 extends through an opening defined by an upwardly extending flange 39 formed in the top wall of the reservoir 14 and is removably secured to a cap 40 by a pair of bayonet type joints which are formed between a pair of pins 41 carried by the cap 40 and a pair of cooperating L-shaped slots 42 formed in the upper end of the sleeve 38. The cap 40 in turn is secured to an annular holder 43 by a split locking ring 44 (see FIG. 1), a shield 47 being interposed between the cap and the annular ring holder 43 to cover the opening within the flange 41.

The holder 43 extends inwardly from and is formed integrally with a vertical bearing 46 which is adjustably secured to the upper end of a vertical rod 47 by a pair of set screws 48. The rod 47 is mounted in a pair of slide bearings 49 which are formed in the outside wall of the reservoir 14 and is formed in two sections 50, 51, the lower end of the upper section 50 being reduced in diameter at 52 and fitting into a bore 53 formed at the upper end of the lower section 51. The sections 50, 51 are separable, but are normally held together by a removable pin 54.

At its lower end, the rod 47 carries a cam roller 56 which operates in a groove 57 cut in the inside face of a stationary ring cam 58 which is carried by the frame (not shown) of the machine 12. A guide key 59, carried by the rod 47 operates in a vertical groove formed in the lower slide bearing 49 to maintain the measuring sleeve 38 in alignment with the funnel 18.

A sealed hollow cylindrical displacement member 61 is carried within the measuring sleeve 38 and is adjustably connected thereto so that the two are movable as a unit. This connection is provided by a rod 62 which projects upwardly from the top of the displacement member 61 and extends through the cap 40 and through an elongated hollow neck 63 which projects upwardly from the cap 40. At its upper end, the rod 62 is connected by a pin 64 to a hollow sleeve 66 which surrounds the neck 63.

The sleeve 66 is connected to the neck 63 by a U-shaped spring clip 68 (see FIGS. 1 and 3) which extends through a pair of oppositely disposed horizontal slots 70 formed in the sleeve 66 and through one pair of a plurality of pairs of identical, oppositely disposed horizontal slots 72 which are formed in the neck 63.

At the start of each charge measuring cycle, the measuring sleeve 38 is held in its uppermost position by the cam 58 so that the bottom end of the sleeve 38 is raised above the cylindrical funnel wall 28, as seen in FIG. 4. As a result, the milk in the reservoir 14 flows into the funnel 18 and into the measuring sleeve 38 and rises around the displacement member 61 to the level of the milk in the reservoir.

As soon as this occurs, the cam 58 lowers the measuring sleeve 38 and displacement member 61 to the position of FIG. 1, thus bringing the bottom end portion of the measuring sleeve 38 into sealing engagement with the funnel wall 28 and sealing off the milk within the measuring sleeve 38 from the milk supply in the reservoir 14.

During the latter part of the downward stroke of the measuring sleeve 38 and displacement member 61, some of the milk trapped within the measuring sleeve 38 is forced upwardly between the measuring sleeve 38 and the displacement member 61 by the downward movement of the displacement member 61, and returns to the reservoir 14 through a plurality of narrow vertical openings 73 which are formed in the measuring sleeve 38 above the level of the milk in the reservoir 14.

Thus, at the conclusion of the downward stroke of the measuring sleeve 38 and displacement member 61, a measured charge of milk is contained within the measuring sleeve 38, the volume of this charge being determined by the position of the displacement member 61 within the measuring sleeve 38.

The volume of the charge may be readily adjusted by changing the position of the displacement member 61 relative to the measuring sleeve 38. This is easily done by simply pulling out the spring clip 68, then either raising or lowering the sleeve 66 relative to the neck 63 to align the sleeve slots 70 with a newly selected set of neck slots 72, and then reinserting the spring clip 68 to lock the sleeve 66 and neck 63 together. In the filling head of FIG. 1, four pairs of neck slots 72 are provided to provide for the selection of measured charges of milk having volumes of one-half pint, one-third quart, one pint, and one quart. Other pairs of neck slots may of course be provided to permit a greater number of variations in the volumes of the charges to be selected.

In the setting shown in FIG. 1, the lowermost set of slots 72 is being utilized, the head 10 thus being set to deliver a one-half pint charge each time the valve 36 is opened. FIG. 2 shows the relative positions of the measuring sleeve 38 and displacement member 61 after an adjustment has been made. In this setting, the clip 68 is inserted into the set of slots 72 which provides a one pint charge of milk.

If a fine or venier adjustment of the volume of the charge is required, the set screws 48 may be loosened and the rod 47 moved slightly relative to the bearing 46 by rotation of a toothed vernier wheel 74 which engages the teeth 75 of a short rack section formed in the upper end of the rod 47. The wheel 74 is journalled in a bearing 76 secured to the bearing 46.

The cartons C are delivered to the machine in any suitable manner and are received on lifter pads 80, one of which is disposed beneath each filling head 10. Each lifter pad 80 is carried on a stem 81 which is suitably mounted for vertical movement in bearings (not shown) which are rotatable with the reservoir 14. The carton C is delivered to the pad 80 with its opening O in vertical alignment with the funnel nozzle 30 while the pad 80 is in its bottommost position.

Thereafter, the pad 80 is raised by means of a stationary annular cam 82, formed with an external groove 84 which engages a cam roller 86 which is carried by the pad 80, to thus bring the flat upper end E of the carton C into lifting engagement against a pair of oppositely disposed lugs 88 of an annular lifter foot 90 which forms a portion of the valve 36. The cam 82 is mounted on the machine frame in the usual manner and is vertically adjustable to accommodate containers of varying heights.

The lifter foot 90 is carried by a cylindrical sleeve 92 which is slidably disposed around the funnel nozzle 30, the lifter foot 90 being keyed to the sleeve 92 by an easily removable U-shaped spring clip 94, the straight leg 96 of which passes through a straight bore 98 in the lifter foot 90 and engages in a slot 100 formed in the sleeve 92, as best seen in FIGS. 5 and 7. The other leg 102 of the clip 94 is curved to snap around the outside surface of the lifter foot 90.

The sleeve 92 carries at its lower end an integral antisplash plate 104 which is formed with a curved upper deflecting surface which directs the milk against the side walls of the carton C during the filling operation and thus minimizes foaming. The plate 104 is formed with a vertical bore 106 which receives the diametrally reduced bottom end 108 of the valve stem member 34 in a sliding fit which maintains the valve stem member 34 in vertical position but yet is loose enough to permit free relative movement between the member 34 and plate 104.

The upper end of the sleeve 92 is formed with an outwardly extending flange 112 which overlies an inwardly extending flange 114 which is formed at the bottom end of an annular holder ring 116 which carries an inwardly inclined drip shield 118 which prevents the drippage of condensate from the funnel 18 onto the top of the carton C. The holder ring 116 is detachably secured to the bottom end of the funnel 18 in a bayonet joint, the funnel 18 for this purpose being provided with a pin 120 which engages in an L-shaped slot 122 which is cut into the upper edge of the holder ring 116, as best seen in FIG. 4. The lifter foot 90, the sleeve 92, and the holding ring 116 are maintained in axial alignment by a pin 124 which is carried by the lifter foot 90 and operates in a blind bore 126 formed in the holder ring 116.

The holder ring 116 is also formed with a pair of oppositely disposed integral lugs 127 which are formed with recesses 128 in which are removably mounted a pair of studs 130 to which are soldered the upper ends of a pair of small compression springs 132 which function to normally maintain the lifter foot 90 and the sleeve 92 in their down position as seen in FIG. 6. The lower ends of the springs 132 are anchored around a pair of studs 134 formed in the lugs 88 of the lifter foot 90.

The studs 130 are held in the recesses 128 by a pair of removable U-shaped spring clips 136, the straight legs 138 of which extend through aligned bores which are drilled through the lugs 127 and the studs 130. The clips 136 are provided with curved legs 140 which snap around the external walls of the lugs 127 to lock themselves in place.

When the lifter foot 90 and sleeve 92 are in their down position, the conical head 33 of the valve stem member 34 seats on the makes line contact with the funnel 18 at the junction of its tapered wall section 24 and nozzle 30. Since the valve stem member 34 is not secured to the anti-splash plate 104, the head 33 is held against the funnel only by the force of gravity, and not by the springs 132.

When the container C is raised by the lifter pad 80 into lifting engagement with the lifter foot 90, the resultant upward movement of the lifter foot 90 compresses the spring 132 and brings the anti-splash plate 104 into engagement with a shoulder 142 which is disposed at the top of the reduced bottom end 108 of the valve stem member 34. Continued upward movement of the lifter foot 90 then results in the conical head 33 of the member 34 being lifted from its sealing engagement against the funnel 18, thus opening the valve 36 and permitting the charge of milk in the measuring sleeve 38 to flow into the container C.

After this container filling operation has been completed, the lifter pad 80 is actuated downwardly by the cam 82, thus lowering the container C preparatory to its discharge from the machine and permitting the springs 132 to move the lifter foot 90 and sleeve 92 to their down position, thus enabling the valve stem member 34 to move downwardly under the influence of gravity to bring its conical head 33 into sealing engagement with the funnel 18. It will be seen that the sleeve 92 overtravels somewhat in order to move the anti-splash plate 104 below the valve stem shoulder 142 to insure seating of the conical head 33 on the funnel 18.

After the valve 36 has thus been closed, the measuring sleeve 38 and displacement member 61 are moved upwardly by the cam 58, thus initiating the next charge measuring and container filling cycle of the machine.

Because of the construction of the filling head 10, it is obvious that its various components can be easily disassembled to facilitate their sterilization at the end of a run. To accomplish this, the holder ring 116 is twisted relative to the funnel 18 to open the bayonet joint therebetween and thus detach it from the funnel and permit removal of all parts of the valve 36 from the funnel 18 with the exception of the valve stem member 34 which remains in the funnel 18.

Next, the U-shaped clip 94 is removed, thus permitting separation of the lifter foot 90, sleeve 92 and holder ring 116. The springs 132 remain with the holder ring 116 in order to prevent their inadvertent loss upon separation of the parts but are easily detached therefrom by removal of the small U-shaped clips 136. If desired the studs 130 may be formed integral with the lugs 127 and the springs 132 made separate therefrom, so that they are separable from the valve 36 merely by separation of the holder ring 116 and lifter foot 90 after removal of the clip 94. This simplifies the structure of the valve 36, but creates the danger of inadvertent loss of the springs 132. Under some circumstances, the springs 132 may be eliminated altogether and gravity relied upon to move the lifter foot 90 and sleeve 92 to their down position, but this construction is not as reliable as the one in which the springs 132 are provided.

After the holder ring 116 has been removed from the funnel 18, the latter is detached from the reservoir 14 by removal of the bolts 20. This gives easy access to the valve stem member 34 which has remained in the funnel 18. Thereafter, the measuring sleeve 38 may be grasped and twisted to open the bayonet joints created by the pins 41 and slots 42 and separate the sleeve 38 from the cap 40.

As a final step in the disassembly of the milk contacting portions of the filling head 10, the pin 54 is removed to permit the upper rod section 50 and all parts secured thereto, including the displacement member 61, to be lifted vertically from the machine.

After these parts have been sterilized in the usual manner by a thorough washing in an approved cleaning and disinfecting solution, they are readily and quickly reassembled to each other and to the machine by a reversal of the just-described disassembling steps.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. A machine for filling a liquid into a container, comprising, in combination, a reservoir for holding a supply of liquid, a funnel disposed at the bottom of said reservoir and terminating in a downwardly extending nozzle, and a valve mechanism for controlling the flow of liquid through said nozzle, said valve mechanism comprising a holder member secured to and extending downwardly from the lower portion of said funnel and surrounding the upper portion of said nozzle, a sleeve member slidably mounted within the portion of said holder member disposed below said funnel for vertically reciprocable movement relative to said nozzle, a valve stem member carried by said sleeve member and extending upwardly through said nozzle and terminating at its upper end in an enlarged head which has a greater diameter than said nozzle and which is engageable against an annular wall portion of said funnel adjacent the upper end of said nozzle to seal said funnel when said sleeve member is in its bottommost position, and a lifter foot member secured to said sleeve member and engageable by the container being filled to raise said sleeve member and said valve stem member to lift the enlarged head of said valve stem member out of sealing engagement with said funnel to permit liquid to flow through said nozzle and into said container.

2. The machine of claim 1 wherein said holder member is detachably secured to said funnel, and wherein said valve stem member is detachably mounted in a transversely extending web secured to said sleeve member, whereby said holder member, said sleeve member and said lifter foot may be detached from said nozzle as a unit.

3. The machine of claim 2 wherein said sleeve member and said lifter foot member are detachably secured together to permit separation of said holder member, said sleeve member, and said lifter foot member.

4. The machine of claim 3 wherein said sleeve member and said lifter foot member are secured together by a removable spring clip.

5. The machine of claim 1 wherein the internal surface of said sleeve member is in slidable engagement with the external surface of said nozzle, and wherein the upper end of said sleeve member is provided with an outwardly extending flange and the lower end of said holder member is provided with an inwardly extending flange adapted to engage said sleeve member flange to prevent removal of said sleeve member from the lower end of said holder member.

6. A machine for filling a liquid into a container, comprising, in combination, a reservoir for holding a supply of liquid, a funnel disposed at the bottom of said reservoir and terminating in a downwardly extending nozzle, and a valve mechanism for controlling the flow of liquid through said nozzle, said valve mechanism comprising a holder member secured to said funnel adjacent said nozzle, a sleeve member carried by said holder member for vertically reciprocable movement relative to said nozzle, a valve stem member carried by said sleeve member and extending upwardly through said nozzle and terminating at its upper end in an enlarged head which has a diameter greater than said nozzle and which is engageable against an annular wall portion of said funnel adjacent the upper end of said nozzle to seal said funnel when said sleeve member is in its lowermost position, a lifter foot member secured to said sleeve member and engageable by the container being filled to raise said sleeve member and said valve stem member to lift the enlarged head of said valve stem member out of sealing engagement with said funnel to thereby permit liquid to flow through said nozzle and into said container, and spring means mounted between said holder member and said lifter foot member to bias said lifter foot member to its normal, bottommost position to thereby permit the enlarged head of said stem member to normally seat against said funnel.

7. The machine of claim 6 wherein said spring means comprise a pair of spaced coil springs which are secured to studs which are secured to said holder member.

8. The machine of claim 7 wherein said studs are detachably secured to said holder member by a pair of removable spring clips.

9. The machine of claim 8 wherein said funnel is detachably secured to said reservoir.

10. The machine of claim 9 wherein a measuring sleeve is mounted in said reservoir in vertical alignment with said funnel for downward movement into sealing engagement with an annular wall portion of said funnel spaced above the annular funnel wall portion which is engageable by the enlarged sealing head of said valve stem member to thereby segregate a measured charge to liquid from the liquid in said reservoir, and wherein means are provided to actuate said measuring sleeve into and out of sealing engagement with said funnel.

11. The machine of claim 10 wherein a displacement member is mounted in said measuring sleeve and operatively connected thereto for movement therewith.

12. The machine of claim 11 wherein said displacement member is connected to said measuring sleeve by a removable spring clip.

13. The machine of claim 12 wherein said displacement member is slidably mounted for movement relative to said measuring sleeve and is selectively connectable to said sleeve member by said spring clip at a plurality of predetermined positions to permit selective variations in the volume of the charge segregated within said sleeve.

14. The machine of claim 13 wherein vernier means are provided to vary the relative position of said displacement member and said measuring sleeve from said predetermined positions.

15. The machine of claim 14 wherein said measuring sleeve and said displacement member are detachably secured to said machine to permit their removal from said reservoir as a unit.

16. The machine of claim 15 wherein said measuring sleeve and said displacement member are detachably secured to each other.

References Cited by the Examiner
UNITED STATES PATENTS

| | | | |
|---|---|---|---|
| 2,343,847 | 3/44 | Swann | 222—440 |
| 2,389,672 | 11/45 | Lippold | 141—86 |
| 2,457,531 | 12/48 | Costakos | 222—440 X |
| 2,535,272 | 12/50 | Detrez | 141—150 X |
| 2,811,282 | 10/57 | Pechy | 121—86 X |
| 2,901,009 | 8/59 | Potter | 222—501 X |
| 3,107,828 | 10/63 | Costakos | 222—181 X |

LAVERNE D. GEIGER, *Primary Examiner.*